United States Patent [19]

Overath et al.

[11] Patent Number: 4,619,470

[45] Date of Patent: Oct. 28, 1986

[54] FLANGE CONNECTION ASSEMBLY FOR FIBER-REINFORCED PLASTIC PIPE MEMBERS

[75] Inventors: Friedhelm Overath, Schaffhausen; Remo Saner, Büsserach, both of Switzerland

[73] Assignee: Georg Fischer Aktiengesellschaft, Schaffhausen, Switzerland

[21] Appl. No.: 703,331

[22] Filed: Feb. 20, 1985

[30] Foreign Application Priority Data

Feb. 20, 1984 [CH] Switzerland ............................ 802/84

[51] Int. Cl.⁴ .............................................. F16L 58/00
[52] U.S. Cl. ..................................... 285/55; 285/368; 285/412; 285/413; 285/414; 285/423; 285/915
[58] Field of Search ................. 285/55, 368, 412, 413, 285/414, 416, 423, DIG. 16

[56] References Cited

U.S. PATENT DOCUMENTS 2,070,291  2/1937  McHugh ................................ 285/55
3,572,392  3/1971  McLarty ......................... 285/423 X
3,702,199  11/1972  Brooke et al. ........................ 285/55

FOREIGN PATENT DOCUMENTS 2011513  9/1971  Fed. Rep. of Germany .
1066132  1/1954  France .
2037666  12/1970  France .
836825  6/1960  United Kingdom .

OTHER PUBLICATIONS

Chemie-Ingenieur-Technik, 25. Jahrg. 1953, Nr. 6, Publisher Verlag Chemie GmbH, Weinheim, Fed. Rep. of Germany, p. 342.

*Primary Examiner*—Richard J. Scanlan, Jr.
*Attorney, Agent, or Firm*—Toren, McGeady, Stanger, Goldberg & Kiel

[57] ABSTRACT

A pair of pipe members are joined together in a flange connection assembly particularly suited for fiber-reinforced plastic components, the pipe members being formed to include an inner pipe jacked consisting essentially of a thermoplastic material and an outer pipe jacket consisting essentially of a fiber winding impregnated with a snythetic resin. A threaded section is formed in each of the outer pipe jackets at the end of each of the pipe members, a flange bushing is provided with a loose flange ring threadedly engaged on each of the threaded sections and a covering collar covering at least the end of each of the pipe members is inserted at the inner pipe jacket.

8 Claims, 3 Drawing Figures

FLANGE CONNECTION ASSEMBLY FOR FIBER-REINFORCED PLASTIC PIPE MEMBERS

The present invention is directed to connection assemblies and more particularly to a flange connection assembly suited for fiber-reinforced plastic pipe parts or members.

More specifically, the invention is directed toward a pipe connection assembly, wherein a pair of pipe members may be joined together, the pipe members comprising an inner pipe jacket consisting essentially of a thermoplastic material and an outer pipe jacket consisting of a fiber winding impregnated with a synthetic resin.

For the transmission of a fluid medium, particularly one having corrosive properties, pipelines are used in the chemical industry which include an inner jacket made from thermoplastic material, such as, for example, polyethylene, polypropylene, polyvinylchloride, etc. The outer jacket member may be made from a fiber-reinforced laminate, such as, for example, wound glass fibers impregnated with an unsaturated polyester resin or epoxide resin. The outer laminated jacket serves to reinforce the pipe assembly in order to enable transmission of the fluid media at high pressures, but also to serve for the withstanding of external stresses, including tensile, compressive or bending stresses to which the pipeline may be subjected.

In the fabrication of detachable connections between pipe members or between pipes and fittings, for example, angles, T-pieces or reducers, it is important that the fluid medium does not come into contact with the outer jacket and that the external stresses be essentially carried by the outer jacket and transmitted by this jacket.

In the prior art, in DE-Al-No. 28 13 599, there is disclosed a process for the shaping of a flange onto fiber-reinforced plastic parts whereby the flange is provided with holes for obtaining a detachable connection.

The shaping of such flanges cannot be accomplished only at the time of laying of the pipelines at the working site, but rather, must be produced in a plant or manufacturing facility by qualified experts at required ambient temperatures utilizing extensive fixtures. With respectively random pipe lengths, no flange connections can be produced by use of this process at the construction site.

Accordingly, the present invention is directed toward providing a flange connection for fiber-reinforced plastic pipe parts of the type previously mentioned which may be attached at cut-to-length pipes during the pipe laying process and which will fulfill several requirements concerning the transmission of stresses and the exposure of surfaces coming into contact with the medium to be transmitted.

SUMMARY OF THE INVENTION

Briefly, the present invention may be described as a flange connection assembly for fiber-reinforced plastic pipe members comprising a pair of pipe members joined together, each of said pipe members comprising an inner pipe jacket consisting essentially of a thermoplastic material and an outer pipe jacket consisting essentially of a fiber winding impregnated with synthetic resin. A threaded section is formed in the outer pipe jacket at the end of each of the pipe members. The assembly also includes a flange bushing provided with a loose flange ring threadedly engaged on each of the threaded sections and a covering collar covering at least the end of each of the pipe members inserted at the inner pipe jacket.

As a result of the present invention, and the particular combination of elements thereof, the medium which is transmitted through the pipe assembly does not come into contact with the outer jacket and the flange bushing and tensile stresses of the flange connection are transferred onto the outer jacket of the parts to be connected in a positively locked way. Notch effects are largely avoided through use of a round thread whereby the connection may be subjected to loads immediately after assembly.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described preferred embodiments of the invention.

DETAILED DESCRIPTION OF THE PREFERRED EMBODIMENTS

Figure 1:
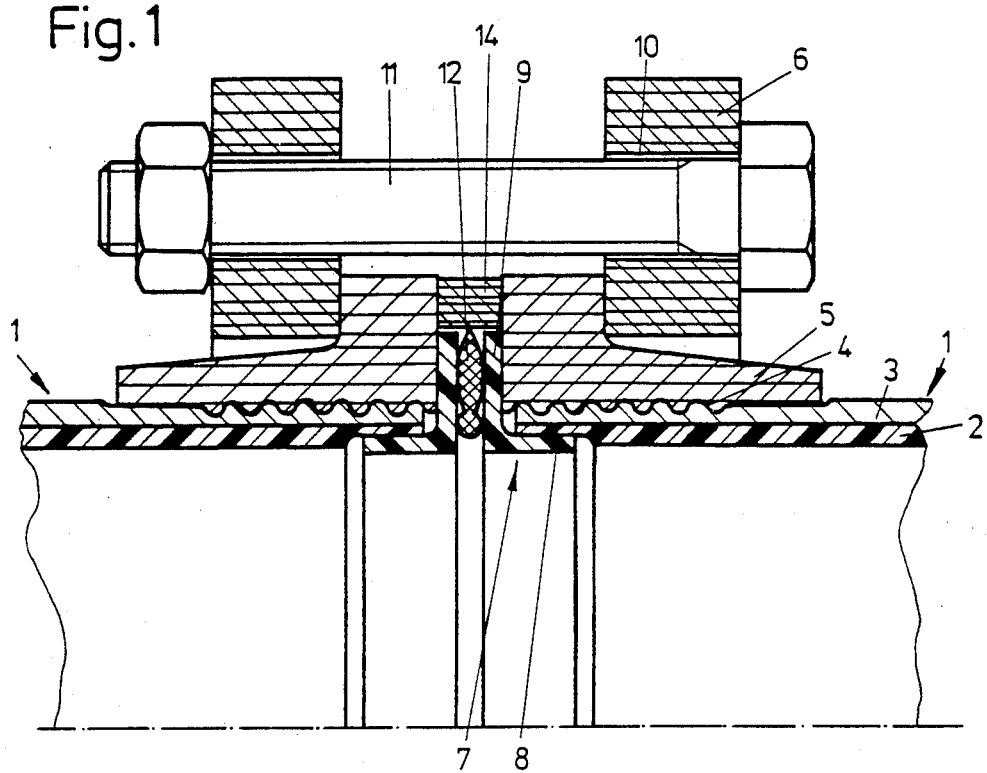
FIG. 1 is a partial longitudinal sectional view of a flange connection assembly for fiber-reinforced pipe members.

Referring now to the drawings and particularly to FIG. 1, there is shown an embodiment of the present invention which comprises a detachable flange connection assembly for joining together a pair of pipe members. In the assembly depicted in FIG. 1, two pipe members 1 which, for example, may be a supply pipe, a fitting, for example, an arc, angle, T-piece or reduction muff or the connecting end of an accessory.

Each of the pipe members 1 comprise an inner pipe jacket 2 which is made from a thermoplastic material, such as, for example, polyethylene, polyvinylchloride or the like and an outer pipe jacket 3 consisting of a fiber winding impregnated with a synthetic resin. Preferably, a laminate of glass fibers with an unsaturated polyester resin or epoxy resin is used.

The outer jacket 3 is applied onto finished extruded pipes or prefabricated as, for example, die cast fittings by means of a lamination process and the outer jacket is solidly connected with the inner jacket by an adhesive.

The ends of each of the pipe members 1 are equipped with a thread 4, preferably a rounded thread, which, for example, can be applied by a mechanical machining process after the pipe members have been cut to any desired length. Of course, differently shaped threads can also be used.

A flanged sleeve 5 provided with a loose ring 6 is screwed onto one end of each of the pipe members 1. The flange sleeve 5 and the loose ring 6 are also fabricated from a laminate, preferably from glass fibers and synthetic resin.

In addition to the positively locking connection, the flange sleeve 5 is advantageously solidly connected with the pipe member 1 by means of an additional bonding connection.

A covering collar 7 having a cylindrical portion 8 is solidly and tightly joined with the inner jacket 2 and covers with a flanged portion 9 thereof the end of the pipe member 1 and partially also covers the front face of the flange bushing or sleeve 5. The covering collar 7 consists preferably of the same thermoplastic material as the inner jacket 2 and is welded together or bonded together with this in a concentric recess.

The assembly is joined together by a bolt 11 which extends through the rings 6 through holes 10. The bolt or threaded connection 11 provides a detachable connection formed between two pipe members 1, 1, wherein, between the front faces of the covering collars 7, there is provided a sealing member 12 made from an elastic material which will not be damaged or attacked by the medium being transmitted. Additionally, a distance ring 14 is provided which establishes the compression of the seal 12 and which is located at the outer circumference of the seal 12 between the flange bushings 5. The ring 14 can also be fabricated from glass fiber laminate.

Figure 2:
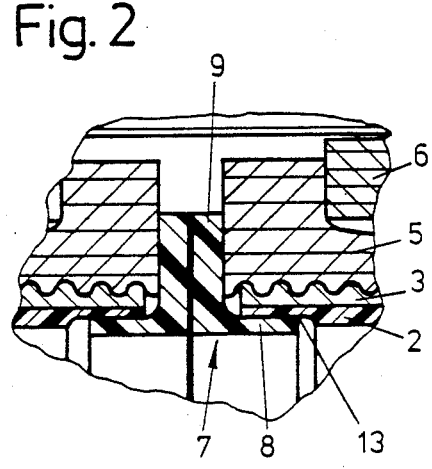
FIG. 2 is a partial sectional view showing another embodiment of the invention.

In the embodiment depicted in FIG. 2, the covering collars 7 are designed to serve simultaneously as seals and, in this embodiment, the covering collars which are fabricated from a thermoplastic material are, with their cylindrical portion 8, bonded or welded into a recess 13 of the inner jacket 2 whereby the sealing surface of the flange portion 9 will be formed to exhibit a precise smooth surface and will be flat.

Figure 3:
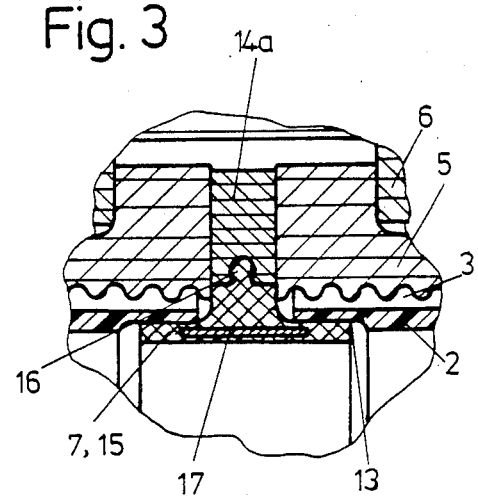
FIG. 3 is a partial sectional view showing another embodiment of the invention.

Another embodiment of the invention is shown in FIG. 3, wherein the covering collar 7 is formed as a single piece designed as a sealing ring 15 which is inserted into the recess 13 of the inner jacket 2. In this embodiment, the sealing action against leakage of the fluid medium being transmitted occurs essentially at the cylindrical circumferential faces of the inner jacket 2 between the sealing ring 15 and the recesses 13. A distance ring 14a is attached at the external circumference of the sealing ring 15 by means of a plug connection 16.

For stiffening and improvement of the sealing action, a stiffening ring 17 which is preferably metallic is arranged in the sealing ring 15 which is fabricated from an elastomer.

Thus, it will be seen that the present invention is designed to join together a pair of pipe members 1, wherein onto an outer jacket 3 of the pipe member 1 consisting of a laminate, a flange bushing 5 consisting of the same material is threadedly attached which is provided with a loose flange ring 6. The covering collar 7 is attached at the end of the inner jacket 2 of the pipe member 1 consisting of a thermoplastic material whereby the medium being transmitted will be prevented from coming into contact with the outer jacket and the flange bushing.

As a result of the arrangement of the invention, and in order to assure against loosening, there is provided the additional bonding between the flange bushing and the outer jacket whereby permeation damage will be avoided by the filling of possibly existing cavities with cement.

By designing this circular flange as a standard flange, these fiber-reinforced plastic pipe members can be connected to other systems or also to valves and minor angular errors during connection can be tolerated.

The flange connection can be produced directly at the assembly site without prefabrication of fitted lengths in the plant being required.

Through suitable selection of the thermoplastic materials for the inner jacket and the covering collar, a high chemical durability of the flange connection will be assured.

While specific embodiments of the invention have been shown and described in detail to illustrate the application of the inventive principles, it will be understood that the invention may be embodied otherwise without departing from such principles.

What is claimed is:

1. A flange connection assembly for fiber-reinforced plastic pipe members comprising:
    a pair of pipe members joined together, said pipe members each comprising an inner pipe jacket consisting essentially of thermoplastic material and an outer pipe jacket consisting essentially of a fiber winding impregnated with a synthetic resin;
    a threaded section consisting essentially of rounded threads formed in said outer pipe jacket at the end of each of said pipe members;
    a flange bushing including a loose flange ring and having rounded threads formed on said bushing threadedly engaged on each of said threaded sections of said outer pipe jacket; and
    a covering collar covering at least the end of each of said pipe members inserted at said inner pipe jacket, said covering collar consisting essentially of a cylindrical portion extending into engagement internally into said inner pipe jacket joined with said inner jacket by a bonded connection which is fluid tight;
    said covering collar being fabricated of the same material as said inner pipe jacket and coextending in engagement therewith to at least partially overlap with said flange bushing;
    said flange bushing consisting essentially of a fiber winding impregnated with synthetic resin and being solidly connected with said pipe members in said threaded section by means of a bonded connection.

2. An assembly according to claim 1, wherein said loose flange ring consists essentially of fiber mats impregnated with synthetic resin.

3. An assembly according to claim 1, wherein each of said flange rings is provided with holes extending therethrough, said assembly further comprising threaded connection means engaged within said holes for joining said flange rings together.

4. An assembly according to claim 1, wherein said bonded connection between said covering collar and said inner jacket is formed by welding.

5. An assembly according to claim 1, wherein said covering collar is configured to act simultaneously as a sealing ring and is fabricated from an elastomer inserted into said inner pipe jacket in order to form a fluid-tight connection.

6. An assembly according to claim 1, comprising a distance ring inserted between faces of said flange bushings.

7. An assembly according to claim 1, wherein said fiber windings consist of glass fibers.

8. An assembly according to claim 2, wherein said fiber mats consist of glass fibers.

* * * * *